(12) United States Patent
Gabrys

(10) Patent No.: US 8,933,607 B1
(45) Date of Patent: Jan. 13, 2015

(54) HIGH EFFICIENCY AIR CORE MOTOR-GENERATOR

(75) Inventor: Christopher W. Gabrys, Reno, NV (US)

(73) Assignee: Revolution Electric Motor Company, Inc., Reno, NV (US)

( * ) Notice: Subject to any disclaimer, the term of this patent is extended or adjusted under 35 U.S.C. 154(b) by 2688 days.

(21) Appl. No.: 11/334,847

(22) Filed: Jan. 18, 2006

Related U.S. Application Data

(60) Provisional application No. 60/644,596, filed on Jan. 18, 2005.

(51) Int. Cl.
*H02K 1/00* (2006.01)

(52) U.S. Cl.
USPC ......................................................... 310/179

(58) Field of Classification Search
USPC ........................................ 310/74, 156.37, 179
See application file for complete search history.

(56) References Cited

U.S. PATENT DOCUMENTS

| | | | | |
|---|---|---|---|---|
| 4,307,309 A * | 12/1981 | Barrett | | 310/166 |
| 4,510,409 A * | 4/1985 | Kanayama | | 310/268 |
| 4,843,269 A | 6/1989 | Shramo | | 310/208 |
| 5,262,746 A | 11/1993 | Masuda | | 336/192 |
| 5,331,244 A | 7/1994 | Rabe | | 310/180 |
| 5,633,545 A * | 5/1997 | Albrecht et al. | | 310/67 R |
| 5,723,933 A | 3/1998 | Grundl | | 310/266 |
| 5,744,896 A | 4/1998 | Kessinger, Jr. | | 310/268 |
| 5,962,943 A * | 10/1999 | Shervington | | 310/156.37 |
| 6,046,518 A * | 4/2000 | Williams | | 310/43 |
| 6,057,621 A * | 5/2000 | Suzuki et al. | | 310/156.12 |
| 6,087,755 A * | 7/2000 | Suzuki et al. | | 310/254 |
| 6,140,726 A * | 10/2000 | Suzuki et al. | | 310/89 |
| 6,194,806 B1 * | 2/2001 | Suzuki et al. | | 310/269 |
| 6,531,864 B2 | 3/2003 | Montagu | | 324/146 |
| 6,725,071 B2 | 4/2004 | Albrecht et al. | | 505/231 |
| 6,768,239 B1 * | 7/2004 | Kelecy et al. | | 310/179 |
| 6,806,612 B2 | 10/2004 | Nakamura | | 310/208 |
| 7,256,521 B2 * | 8/2007 | Fukasaku et al. | | 310/71 |
| 2001/0040412 A1 * | 11/2001 | Yamaguchi | | 310/81 |
| 2003/0035960 A1 * | 2/2003 | Tsunoda et al. | | 428/413 |

* cited by examiner

*Primary Examiner* — Amy Cohen Johnson
*Assistant Examiner* — Jason Collins
(74) *Attorney, Agent, or Firm* — J. Michael Neary

(57) ABSTRACT

An air core motor-generator has a rotor that rotates about an axis of rotation, and a stationary stator that magnetically applies torque to the rotor. The rotor includes magnetic poles that drive magnetic flux across an armature airgap. The stator has an air core armature located in the armature airgap, with windings such that the magnetic flux across the airgap penetrates directly transversely through the windings and induces an AC voltage in the windings as the rotor rotates. The armature windings are wound with wire that is assembled of a stack of multiple individually insulated ribbon conductors connected in parallel to form said wire. The ribbon conductors having a narrow thickness and a width substantially greater than said thickness. The armature is oriented in the airgap with the width of the ribbon conductors extending in the direction across the airgap and oriented parallel to the flux direction.

20 Claims, 5 Drawing Sheets

HIGH EFFICIENCY AIR CORE MOTOR-GENERATOR

This is related to U.S. Provisional Application No. 60/644,596 entitled "Slotless Motor-Generators" and filed on Jan. 18, 2005.

This invention pertains to brushless motor-generators and more particularly to air core motor-generators employing specialized windings that provide substantially increased efficiency and power capability while also having simplified construction.

BACKGROUND OF THE INVENTION

Air core motor-generators have the potential to provide higher efficiency and performance than conventional type electrical machines. They achieve these advantages by eliminating slot wound armature windings wherein the windings are wound in slots in a steel stator, and instead locate the windings within the magnetic airgap. Air core motor-generators can utilize single rotating or double rotating construction. Single rotating construction utilizes a loss mitigating ferromagnetic stator on one side of the airgap. Double rotating air core motor-generators eliminate the need to pass a circumferentially varying flux through a ferromagnetic stator by bounding both sides of the magnetic airgap by rotating surfaces of the rotor.

Various different methods for constructing air core armatures have been utilized along with different winding pattern configurations. Even further increased efficiency and power capability with air core motor-generators is desired.

It has been found through experience that the use of Litz wire windings for the armatures of air core motor-generators is in many cases less than optimal. Litz wire can successfully reduce eddy current losses from transverse penetrating flux from the rotor poles due to the small conductor cross-section size. Litz wire also has a maximum theoretical packing factor of about 90% that should allow high efficiency. However, it has been found that a practically achievable packing factor is lower than the theoretical value. Packing factors of about 55% are more typical. In addition, compaction of Litz wire is difficult without the use of a high compression force on the windings. This compaction force requirement makes manufacturing of air core armatures more difficult and is undesirable.

SUMMARY OF THE INVENTION

The invention provides an air core motor-generator with a higher efficiency from a high copper density air core armature and having low eddy current losses from rotor pole transverse flux penetration. The invention is an air core motor-generator for converting between electrical energy and rotational energy. The motor-generator comprises a rotor that rotates about an axis of rotation and a stator that is stationary and magnetically applies torque to the rotor. The rotor comprises magnetic poles that drive magnetic flux across an armature airgap. The stator comprises an air core armature located in the armature airgap and having windings such that the magnetic flux penetrates directly transversely through the windings and that an AC voltage is induced in the windings as the rotor rotates. The windings are wound with wire that is assembled of multiple individually insulated flat-sided conductors, and the conductors are bunched together prior to winding and electrically connected in parallel to form the wire.

In one embodiment, the wire is formed of an untwisted, or untransposed, bundle of individually insulated rectangular conductors that are stacked together prior to winding the armature and are electrically connected together in parallel. In an additional embodiment, the windings are wound with wire formed from multiple individually insulated ribbon wires that are bundled together and enclosed by an outer insulating serve. The serve provides protection against dielectric breakdown and corona inception voltage. The serve can be particularly effective since the corners of the conductors have a higher electrical field and also are typically more difficult to insulate in the conductor coating process.

The air core motor-generator can incorporate both single rotating and double rotating constructions. In a single rotating construction, the armature airgap is formed between the rotor and a stationary ferromagnetic stator. The rotating and circumferentially varying magnetic flux from the rotor penetrates transversely through the armature windings and into the ferromagnetic stator. Losses are reduced by the elimination of slots in the ferromagnetic stator into which the windings are inserted, however the varying flux still results in some eddy current and hysteresis losses in the steel stator even when employing a laminated construction. The benefit of a single rotating construction is a reduced required armature airgap thickness.

A preferred construction air core motor-generator for highest efficiency is a double rotating configuration. In this configuration, the armature airgap is bounded on both sides by rotating surfaces of the rotor. The rotating and circumferentially varying magnetic flux from the rotor penetrates transversely through the armature windings and into another ferromagnetic portion of the rotor. The flux traverses circumferentially through the steel rotor portions and directly across the armature airgap when penetrating the air core armature windings. The maximum performance in the double rotating air core motor-generator configuration is further achieved by located magnets for the magnetic poles on both rotor surfaces facing the armature airgap. Magnets on both sides of the armature airgap provide the highest armature airgap flux density per weight of magnet utilized in the motor-generator.

The air core motor-generator can be constructed with either a radial armature airgap or and axial armature airgap. In a radial airgap design, the diameter of the motor-generator can be reduced for a given power capacity and rotational speed. The axial gap configuration however allows for a greater magnet peripheral speed. The higher speed allows greater power capability per magnet weight, can be easier to construct, and is typically lower in cost. In an axial gap air core motor-generator, the armature airgap is axial and the longer direction of the conductors of the stacked parallel ribbons lies in the axial direction inside the armature airgap.

In all configurations of the air core motor-generators, the losses from the transverse penetrating flux through the windings from the rotor is minimized by choosing the proper thickness of the ribbon conductors in the bunch. To minimize the eddy current losses from the flux, the ribbons should be made substantially thin. However, the lesser the thickness of the individual ribbons, the greater is the resistive losses in motor-generator operation. With thinner ribbon conductor thickness, the insulation on the individual conductors becomes a larger portion of the total stack of parallel conductors forming the winding wire. As a result the copper density is reduced and the winding resistance increased, reducing the motor-generator performance. It has been found that the short side dimension of the conductors is preferably between 10 and 100 mils.

One additional and significant advantage of the air core motor generator windings is that the winding wire can be constructed of sufficient cross-section so as to limit the number of turns required in the motor-generator. As a result, the air core armature need not be constructed of multiple coils wound and separately connected in parallel during assembly. In contrast, the windings of a single phase can be designed for serial connection around the diameter of the air core motor-generator. This provides the advantage that the armature can be wound having more than one coil wound continuously together. This substantially reduces the manufacturing time and it also eliminates many electrical connections and increases the motor-generator efficiency.

DESCRIPTION OF THE DRAWINGS

The invention and its many features and advantages will become better understood upon reading the detailed description of the preferred embodiments in conjunction with the following drawings, wherein:

FIGS. 4 and 4A are sectional elevations of a portion of air core armature windings wound with Litz wire, not in accordance with the invention.

DESCRIPTION OF THE PREFERRED EMBODIMENTS

Figure 1:
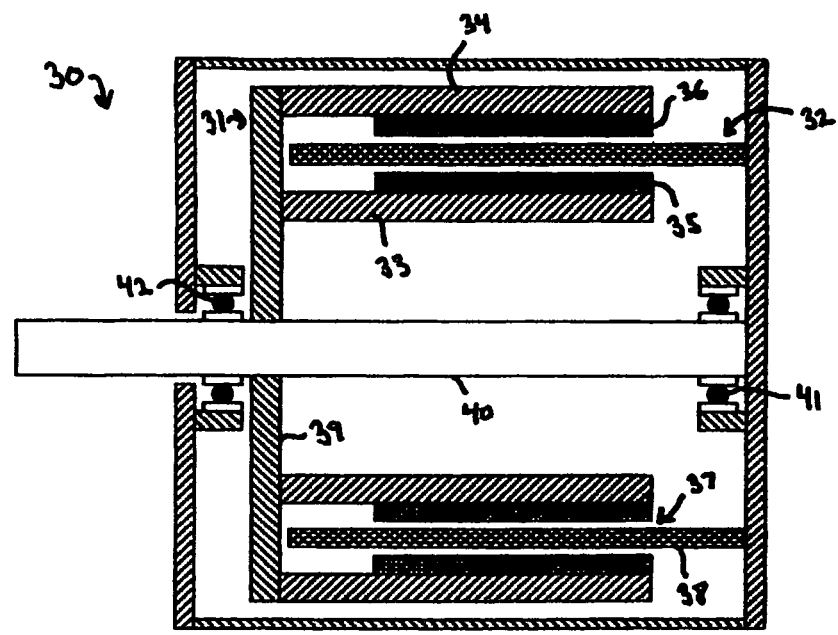
FIG. 1 is a sectional elevation of a radial gap brushless air core motor-generator in accordance with the invention.

Turning to the drawings, wherein like reference characters designate identical or corresponding parts, FIG. 1 shows an air core motor-generator in accordance with the invention. The air core motor-generator 30 is comprised of a rotor 31 and a stator 32. The rotor 31 is constructed from two concentric steel cylinders 33, 34. Each cylinder 33, 34 has circumferential arrays of alternating radial polarity magnets 35, 36, aligned in polarity on opposing cylinders. The magnets 35, 36 drive magnetic flux across and armature airgap 37. Located in the armature airgap 37 is an air core armature 38 having windings such that the magnetic flux penetrates directly transversely through the windings. AC voltage is induced in the windings of the air core armature 38 as the rotor 31 rotates. Of particular importance to the invention, are the air core armature windings, which will be illustrated in detail in following figures. The steel cylinders 33, 34 are attached to a hub 39 that is mounted on a center shaft 40. The shaft is journalled for rotation by bearings 41, 42.

Figure 2:
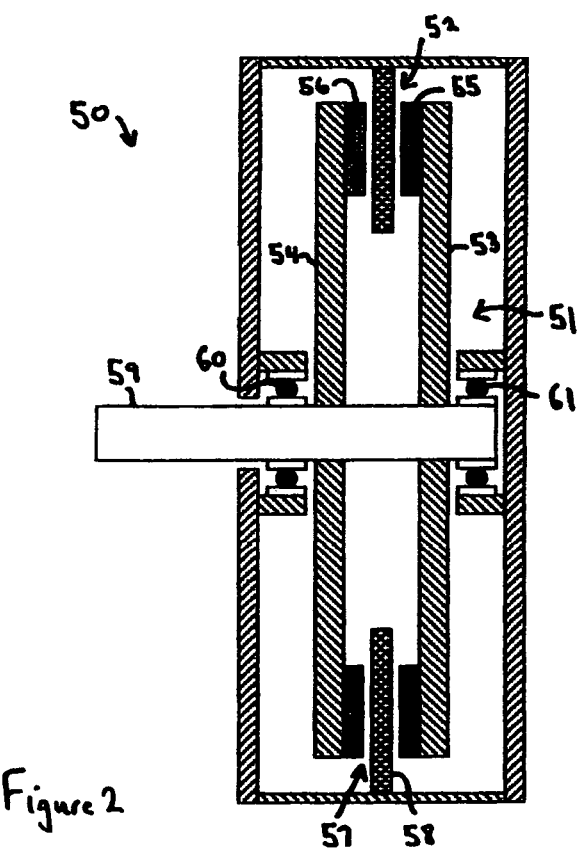
FIG. 2 is a sectional elevation of an axial gap brushless air core motor-generator in accordance with the invention.

An alternate configuration brushless air core motor-generator in accordance with the invention is shown in FIG. 2. The motor-generator 50 is comprised of a rotor 51 and a stator 52. The rotor 51 is constructed from two steel discs 53, 54. Each disc 53, 54 has circumferential arrays of axially alternating polarity magnets 55, 56 near the outer diameter. The magnets 55, 56, aligned in polarity on opposing discs, drive magnetic flux axially across an armature airgap 57 formed between the discs 53, 54. Located in the armature airgap 57 is an air core armature 58 having windings such that the magnetic flux penetrates directly transversely through the windings. AC voltage is induced in the windings of the air core armature 58 as the rotor 51 rotates. The steel discs 53, 54 are attached to a center shaft 59 and the shaft 59 is journalled for rotation by bearings 60, 61.

The armature of the air core motor-generator is constructed from windings that are assembled together into a substantially non-magnetic structure that has sufficient structural rigidity to transfer the operation torque. The windings pattern can be constructed from individual round coils that are assembled together or alternatively can be constructed with serpentine coils that progress around the circumference of the motor. One type of construction utilizes a plastic form having grooves, channels, or slots into which the windings are wound onto the form for low cost fabrication.

Figure 3:
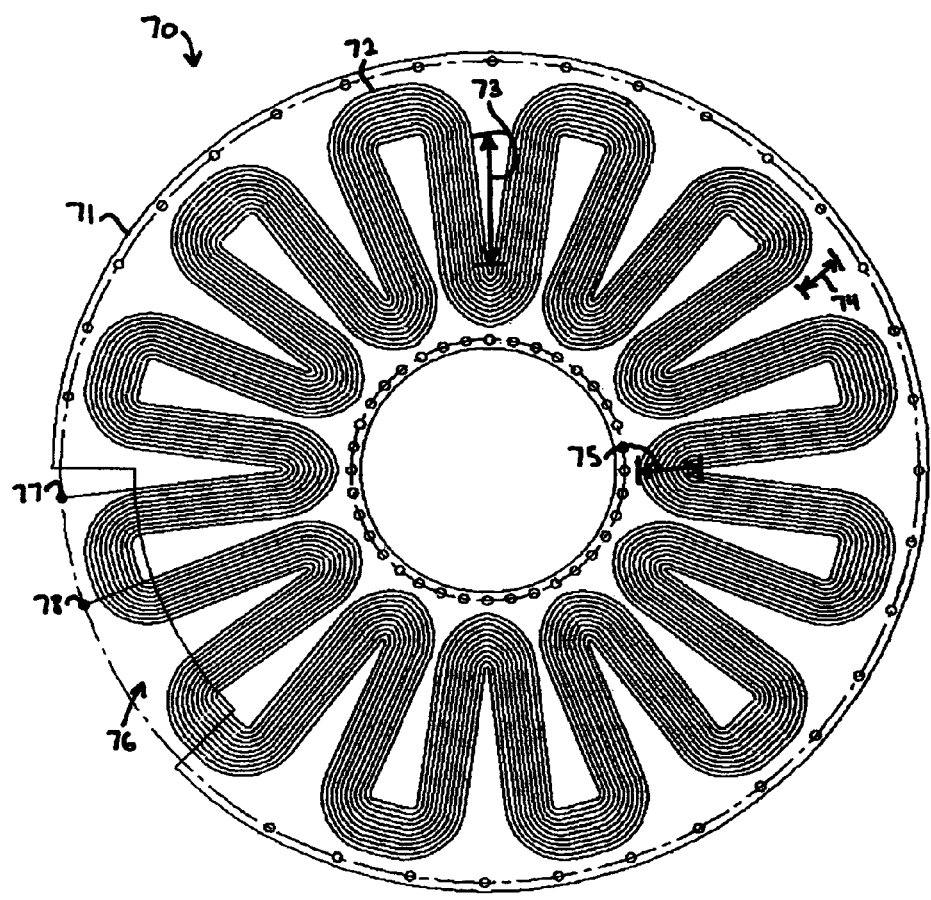
FIG. 3 is an elevation of an air core armature for use in an axial gap air core motor-generator in accordance with the invention, such as shown in FIG. 2.

A schematic drawing of an air core armature for use in an air core motor-generator in accordance with the invention is shown in FIG. 3. The armature 70 is constructed of a plastic form 71 with surface channels. The windings 72 are snapped into the surface channels. The windings 72 have active lengths 73 that are located in the magnetic flux from the rotor of the motor-generator. The windings 72 also have end turns 74, 75 that circumferentially connect together the active lengths 74. As shown, the windings have a start 77 and an end 78 wherein the windings progress circumferentially around the form 71 without connections. A notch 76 is cut into the form 71 to allow for the overlapping of the end 78.

Figure 4:
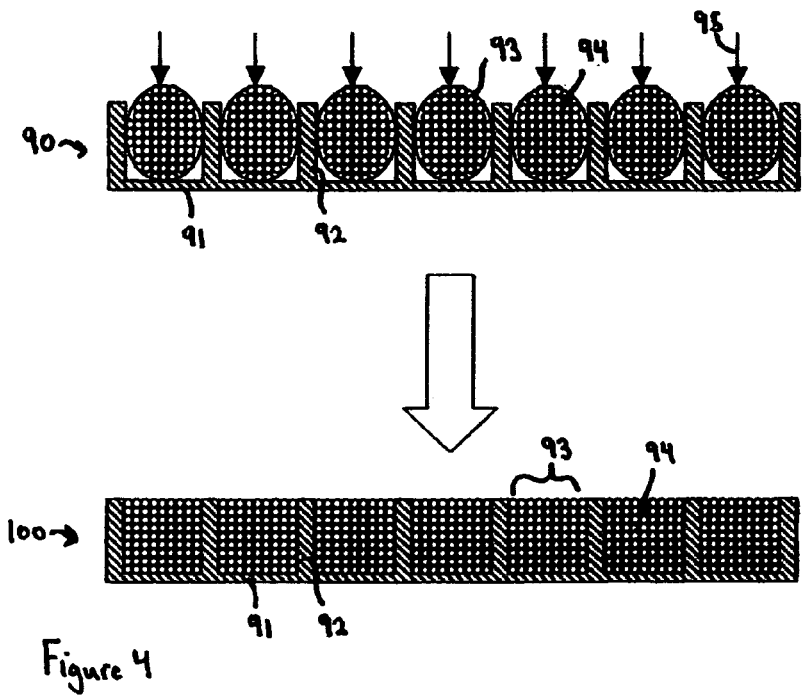

In previous constructions, the windings of the air core armature have been wound using Litz wire. A schematic drawing of air core armature windings wound with Litz wire, not in accordance with the invention is shown in FIG. 4. The post-wound armature 90 has a plastic form 91 with channels 92. Wound into the channels 92 is Litz wire 93. The Litz wire 93 has multiple individually insulated round strands 94 that are twisted together. After winding, the Litz wires 93 are compressed with compression pressure 95 typically applied by the use of assembly tooling. The post-compressed armature 100 has the Litz wires 93 compressed into the channels 92 of the form 91. The individual conductors 94 are preferably as highly dense as possible to reduce the windings resistance and increase the efficiency of the motor.

Figure 5:
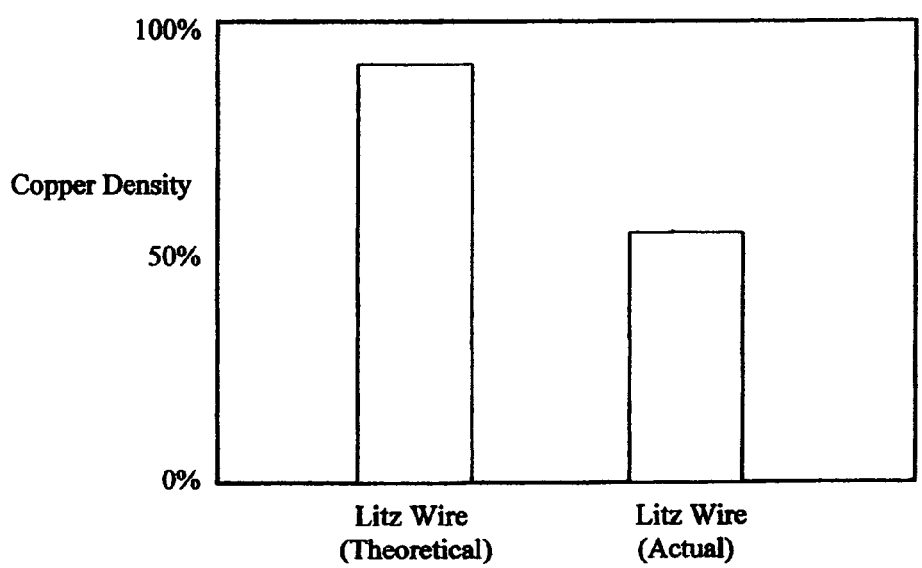
FIG. 5 is bar graph comparing the theoretical and actual copper density for a Litz wound armature.

A comparison of theoretical and actual copper density for a Litz wound armature is shown in FIG. 5. The copper density is the total cross-sectional area of copper conductors divided by the total cross-sectional area of the space for the wire. In the case of the form wound air core armature, this space corresponds to the dimensions of the channels for the windings. With a near perfect assembly of the conductors of the Litz wire bundle, the theoretical copper density for Litz windings can achieve 90%. This copper density would require high compression force to compact the individual conductors together. Despite the high theoretical winding density possible with Litz wire windings, we have found that a more typical copper density achievable with Litz windings is around only 55%, as shown. The reasons for the lower copper density stem from causes including lack of ability to get enough compaction onto the windings, the twisting in the round conductors preventing full compaction and the insulation on the individual strands displacing the room for copper. The result of the lower actual copper density than theoretical with Litz windings is that the efficiency and power capability are reduced and the size of the motor-generator for a given performance must be increased, increasing cost.

Figure 6:
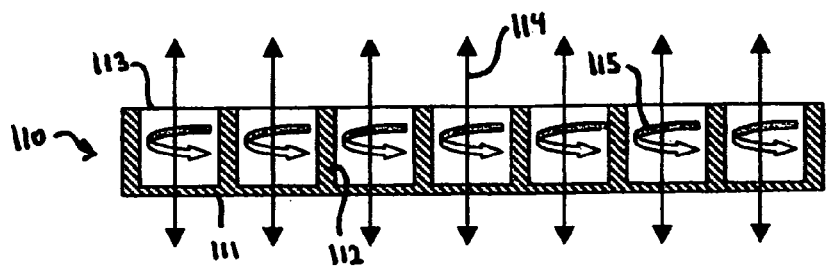
FIG. 6 is a sectional elevation of air core armature windings wound with rectangular wire.

The maximum possible copper density for the air core armature is achievable by using rectangular shaped windings. A schematic drawing of air core armature windings wound with rectangular wire not in accordance with the invention is shown in FIG. 6. The post-wound armature 110 has a plastic form 111 with channels 112. Located in the channels are rectangular wires 113 that completely fill the channels 112. The wires 113 provide 100% copper density for minimized resistive losses in operation. Unfortunately, the increased copper density and reduced armature resistance come at the expense of unacceptably high eddy current losses. Even without power applied to the armature windings 113, rotation of the rotor creates substantial losses. The eddy current losses are the result of magnetic flux 114 from the rotor poles penetrating directly transversely through the thick windings 113. As the rotator rotates, the flux 114 changes value and polarity, in turn causing large eddy currents 115 to flow in the conductors. The large eddy current losses overpower any benefits obtained from the reduced resistance from increased copper density.

Figure 7:
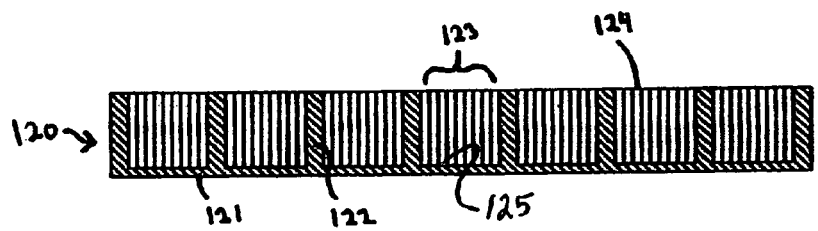
FIG. 7 is a sectional elevation of air core armature windings wound with stacked parallel ribbon conductors in accordance with the invention.

A desirable winding for air core motor-generators preferably would have the high copper density of the rectangular conductor wires while also providing the eddy current loss mitigation of Litz wire in an air core armature. A schematic drawing of air core armature windings wound with stacked parallel ribbon conductors in accordance with the invention is shown in FIG. 7. The post-wound armature 120 has a plastic form 121 with channels 125. The winding wires 123 are located in the channels 125 between ribs 122. The winding wires 123 provide the maximum possible copper density, mitigation of transverse flux penetration induced eddy currents, and also eliminates the need for application of high compaction force to the air core armature. The wires are formed of a bundle of individually insulated rectangular or ribbon conductors 124 that are electrically connected together in parallel, wherein the conductors 124 are stacked together face-to-face prior to winding into the air core armature. The ribbon conductors have a width about equal to the depth of the channels 125 in the form 121, and a narrow thickness in the direction across the channels 122. The narrow thickness of the parallel ribbon precludes the development of large eddy currents from the rotation of the rotor and transverse penetration of the magnetic flux. The long width dimension of the ribbons provides increased copper area, and the copper area is further increased by the compact stacking of the ribbon conductors 124. The narrow thickness of the conductors 124 preferably has a dimension between 10 mils and 100 mils, and preferably 13-30 mils, so as to limit eddy currents while also reducing the resistive losses for the maximum total operating efficiency. The conductors can be formed of a single stack or of multiple stacks. An additional advantage of the bundled and electrically paralleled ribbon conductors is that fewer turns are required to fill the space of the air core armature, thereby reducing the resistance of the windings per coil. Multiple coils can therefore be wound continuously, saving manufacturing costs and reducing the required number of electrical connections in the air core motor-generator.

Orienting the width of the conductor ribbons 124 in the direction across the airgap and the narrow thickness of the ribbon conductors transverse to the dimension across the armature airgap minimizes magnetic induction of eddy currents. However, because the magnets 35, 36 in FIG. 1 and magnets 55, 56 in FIG. 2 are arranged as circumferentially alternating polarity arrays, there will inevitably be a degree of leakage flux between adjacent magnets. Since portions of the leakage flux will extend transverse to the narrow thickness of the ribbon conductors 124, those portions of the leakage flux have the potential of causing eddy current losses in the armature windings. Therefore, it is preferable to utilize flux leakage mitigating structures in the rotor to minimize the amount of leakage flux intersecting the armature. Such flux leakage mitigating structures can include spaces or high-reluctance inserts between circumferentially adjacent magnets.

Figure 8:
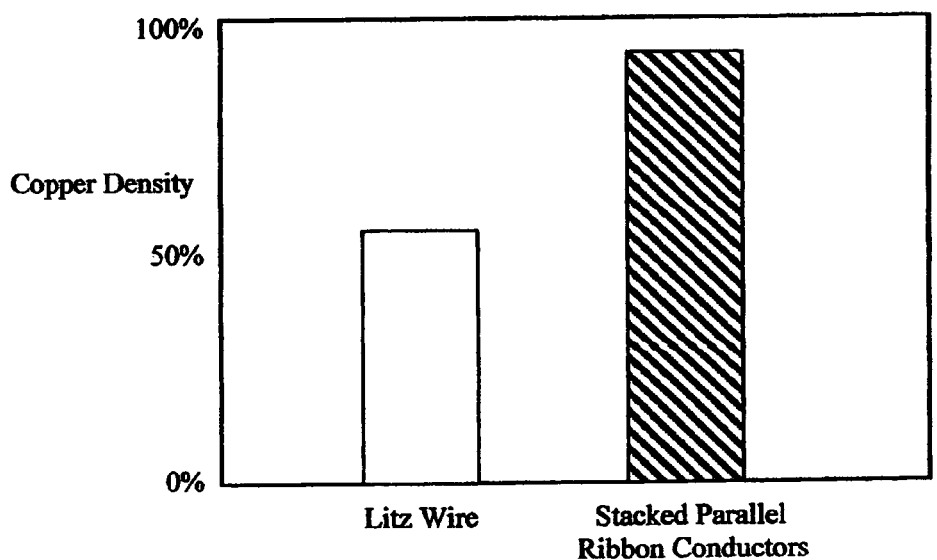
FIG. 8 is a bar graph comparing copper density for armatures with Litz wire and stacked parallel ribbon conductors.

A comparison of copper density for armatures with Litz wire and stacked parallel ribbon conductors in accordance with invention is shown in FIG. 8. The Litz wire windings provide a copper density of 55% and with the required addition of significant compaction pressure. The stacked paralleled ribbon conductors provide a copper density of about 90%. The stacked paralleled ribbon conductors also do not require compaction pressure, which makes the air core armature much easier to manufacture.

Figure 9:
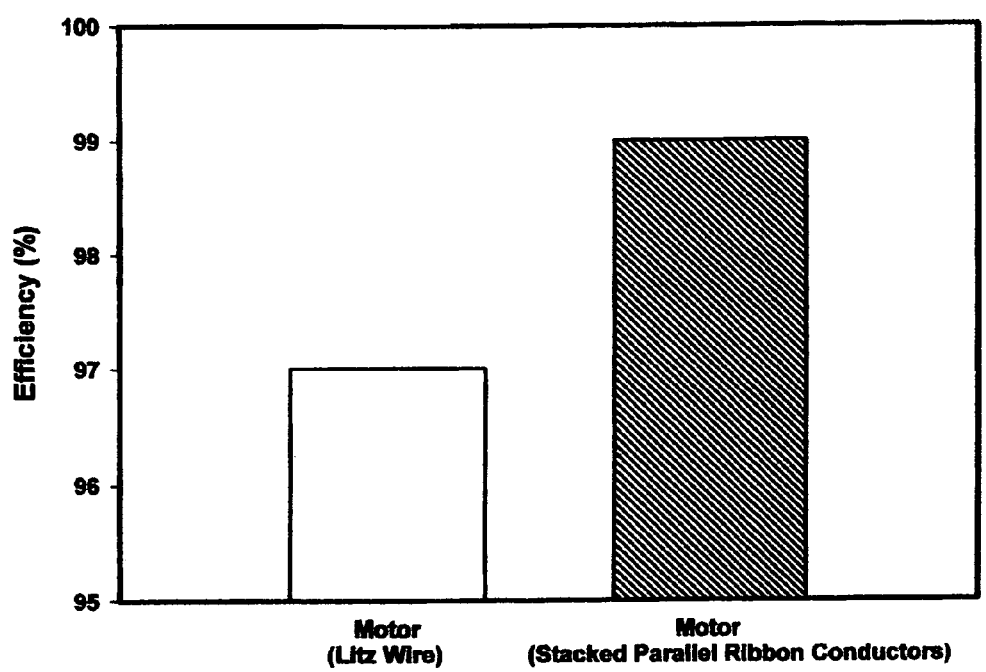
FIG. 9 is a bar graph comparing motor efficiencies for air core motor-generators with Litz wire and stacked parallel ribbon conductors.

The significantly higher copper density for the air core armature in motor-generators utilizing the stacked paralleled ribbon conductor windings provides a substantial increase in the performance. A comparison of motor efficiencies for air core motor-generators with Litz wire and stacked parallel ribbon conductors in accordance with the invention is shown in FIG. 9. For a 25 Hp 1800-rpm air core motor with Litz wire windings, the efficiency is about 97.0%. For the same motor but employing the stacked paralleled ribbon conductor wire, the efficiency is increased to 98.8%. The increased energy efficiency translates to significant energy cost savings for the motor operator. The increased efficiency also does not cost any more to produce, and is in fact slightly less costly because of lower cost manufacturing with the stacked paralleled ribbon conductor wire compared with Litz wire.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

I claim:

1. An air core motor-generator for converting between electrical energy and rotational energy comprising:
   a rotor that rotates about an axis of rotation, and a stationary stator that magnetically applies torque to said rotor;
   said rotor comprising magnetic poles that drive magnetic flux across an armature airgap;
   said stator comprising an air core armature located in said armature airgap and having windings such that said magnetic flux penetrates directly transversely through said windings and induces an AC voltage in said windings as said rotor rotates;
   said windings are wound with wire that is assembled of a stack of multiple individually insulated flat sided conductors having a wide flat face and a thin thickness, and said conductors are bunched together face-to-face prior to winding and electrically connected in parallel to form said wire.

2. An air core motor-generator as described in claim 1, wherein:
   said armature airgap is bounded on both sides by rotating surfaces of said rotor.

3. An air core motor-generator as described in claim 2, wherein:

said armature airgap is axial and the wide face dimension of said conductors lies in the axial direction inside said armature airgap.

4. An air core motor-generator as described in claim 1, wherein:
the short side dimension of said conductors is between 10 and 100 mils.

5. An air core motor-generator as described in claim 1, wherein:
said air core armature is wound having more than one coil wound continuously together.

6. An air core motor-generator as described in claim 1, wherein:
said wire has an outer insulating serve over the bunch of said conductors.

7. An air core motor-generator as described in claim 1, wherein:
said magnetic poles are formed by permanent magnets that are located on said rotor.

8. An air core motor-generator for converting between electrical energy and rotational energy comprising:
a rotor that rotates about an axis of rotation and a stator that is stationary and magnetically applies torque to said rotor;
said rotor comprising magnetic poles that drive magnetic flux across an armature airgap;
said stator comprising an air core armature located in said armature airgap and having windings such that said magnetic flux penetrates directly transversely through said windings to induce an AC voltage in said windings as said rotor rotates;
said windings are wound with wire formed of an untwisted bundle of individually insulated rectangular conductors having a wide face and a thin edge thickness, said conductors being electrically connected together in parallel;
said conductors are stacked together prior to winding into said air core armature.

9. An air core motor-generator as described in claim 8, wherein:
said armature airgap is bounded on both sides by rotating surfaces of said rotor.

10. An air core motor-generator as described in claim 9, wherein:
said armature airgap is axial and the wide face dimension of said conductors lies in the axial direction inside said armature airgap.

11. An air core motor-generator as described in claim 8, wherein:
the thin edge dimension of said conductors is between 10 and 100 mils.

12. An air core motor-generator as described in claim 8, wherein:
said air core armature is wound having more than one coil wound continuously together.

13. An air core motor-generator as described in claim 8, wherein:
said wire has an outer insulating serve over said bundle of said conductors.

14. An air core motor-generator as described in claim 8, wherein:
said magnetic poles are formed by permanent magnets that are located on said rotor.

15. An air core motor-generator for converting between electrical energy and rotational energy comprising:
a rotor that rotates about an axis of rotation and a stator that is stationary and magnetically applies torque to said rotor;
said rotor comprising multiple permanent magnet poles that drive magnetic flux across an armature airgap;
said stator comprising an air core armature located in said armature airgap and having windings such that said magnetic flux penetrates directly transversely through said windings and that an AC voltage is induced in said windings as said rotor rotates;
said windings are wound with wire formed from multiple individually insulated ribbon wires having a wide flat face and a thin thickness, said ribbon wires are bundled together and enclosed by an outer insulating serve.

16. An air core motor-generator as described in claim 15, wherein:
said armature airgap is bounded on both sides by rotating surfaces of said rotor.

17. An air core motor-generator as described in claim 16, wherein:
said armature airgap is axial and the flat face dimension of said conductors lies in the axial direction inside said armature airgap.

18. An air core motor-generator as described in claim 15, wherein:
the thickness dimension of said conductors is between 10 and 100 mils.

19. An air core motor-generator as described in claim 15, wherein:
said air core armature is wound having more than one coil wound continuously together.

20. An air core motor-generator as described in claim 15, wherein:
said armature airgap is radial and the flat face dimension of said conductors lies in the radial direction inside said armature airgap.

* * * * *